United States Patent Office 3,199,181
Patented Aug. 10, 1965

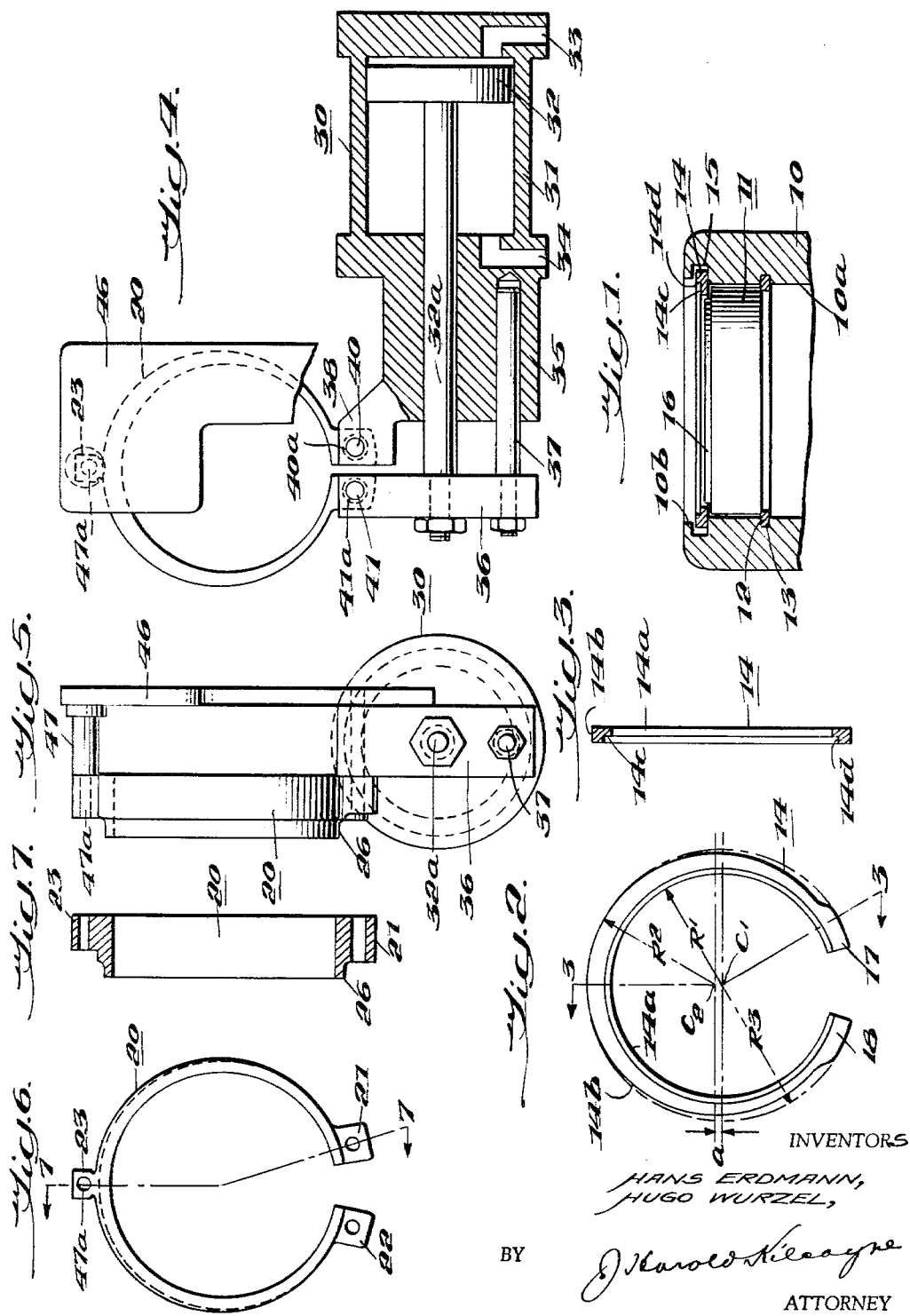

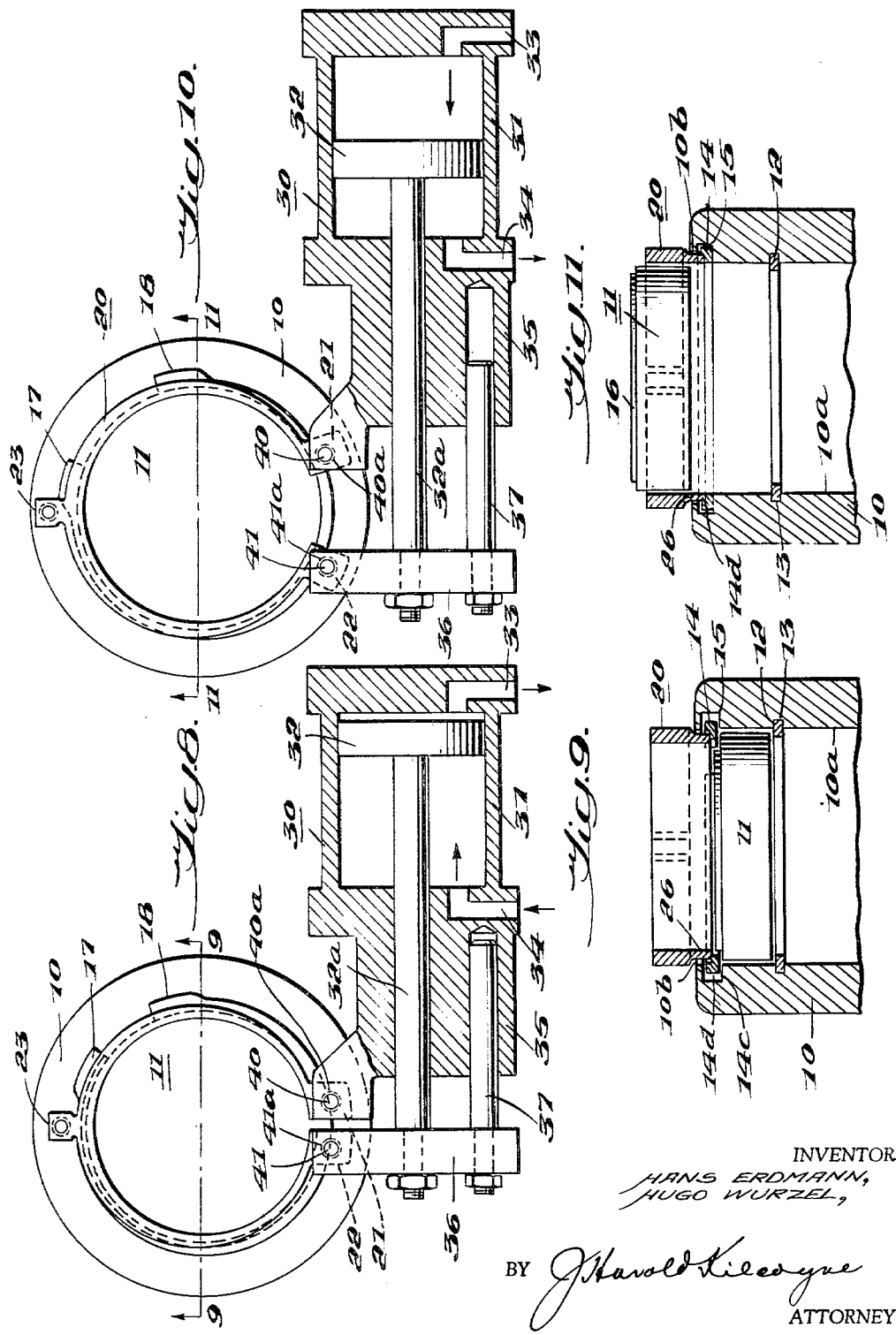

3,199,181
RETAINING RING APPLICATION AND A RETAINING RING AND AN ASSEMBLING AND DISASSEMBLING FIXTURE FOR USE THEREWITH
Hans Erdmann, Maplewood, N.J., and Hugo Wurzel, Bronx, N.Y., assignors to Waldes Kohinoor, Inc., Long Island City, N.Y., a corporation of New York
Original application Feb. 9, 1961, Ser. No. 88,126, now Patent No. 3,104,905, dated Sept. 24, 1963. Divided and this application Jan. 17, 1963, Ser. No. 258,094
3 Claims. (Cl. 29—229)

This invention relates to improvements in a retaining ring application and in a retaining ring and an assembling and disassembling fixture for use therewith.

While retaining ring applications comprising a tubular member such as a housing, a cylindrical container, etc., an internal part such as a machine element or an internally mounted cover plate disposed in the bore thereof, and a retaining ring seated in a groove provided in the bore wall and serving to secure said machine element or cover plate in place in the bore, are in general well known, the retaining ring employed therein was of the conventional type necessitating its bodily removal from its groove in order to assemble and disassemble the components making up such a ring application. One important object of the invention is the provision of a retaining ring application which utilizes the spring retaining ring as the machine element- or cover plate-securing means generally as was known previously, but whose design and construction are such as to provide not only that the ring is permanently coupled to the tubular member (housing or container member) rather than being bodily removable therefrom as heretofore, but also, and equally important, as to provide for the ring being spreadable to an internal diameter corresponding substantially to that of the bore in which it normally serves as an internal shoulder, rather than being contractible to an external diameter slightly less than that of the bore, as was previously required to permit bodily removal of said ring from the bore for assembling and disassembling purposes.

Another important object of the invention is the provision of an improved internal retaining ring for use in applications in which it is permanently connected to a tubular member in whose bore it serves to provide as an internal shoulder, the design and construction of which are such that, rather than being only contractible as heretofore, it is spreadable radially in its groove, thus to provide in effect a retractible bore shoulder.

Another important object of the invention is the provision of a simple, practical, and dependable assembly fixture for use with a retaining ring application as aforesaid.

Still another object of the invention is the provision of a dependable, power-operated type of parts assembling and disassembling fixture for use with retaining ring applications employing a spreadable internal retaining ring as aforesaid, characterized by a construction enabling its being readily coupled to the groove-seated retaining ring and by an ability to spread the ring in its bore to an internal diameter corresponding substantially to that of the bore itself, as in turn enables the bore-mounted part or plate to be moved axially along the bore as is necessary for its assembly therein and disassembly therefrom.

The above and other objects and advantages of the retaining ring application, the improved retaining ring and the assembly fixture therefor according to the invention will appear from the following detailed description, in which reference is had to the accompanying illustrative drawings, wherein:

FIG. 1 is a broken-away vertical section through a retaining ring application to which the present invention is directed in one of its aspects;

FIG. 2 is a plan view of the spreadable, internal-type retaining ring employed in the FIG. 1 application, which constitutes another aspect of the present invention;

FIG. 3 is a section through such a retaining ring taken along line 3—3 of FIG. 2;

FIG. 4 is a plan view, partly in section, of the improved assembly fixture for use in assembling and disassembling the components of the retaining ring application shown in FIG. 1, which constitutes yet another aspect of the present invention;

FIG. 5 is an end view of the fixture shown in FIG. 4;

FIGS. 6 and 7 are detail views of the spreader band employed in the fixture according to FIG. 4, said views showing said band in plan and in section, respectively;

FIG. 8 is a part-sectional plan view which illustrates a fixture according to FIG. 4 initially coupled to a retaining ring application according to FIG. 1;

FIG. 9 is a section taken along 9—9 of FIG. 8;

FIG. 10 is a part-sectional plan view corresponding to FIG. 8 but showing the fixture as having completed its retaining-ring spreading operation and the machine element or cover plate previously secured thereby in the course of diassembly; and FIG. 11 is a section taken along line 11—11 of FIG. 10.

Referring to the drawings in detail, FIG. 1 illustrates a typical retaining ring application according to the present invention, such comprising a tubular part or member 10 having a bore 10a, a closely fitting part 11 disposed within the bore whose innermost position therein is defined by any suitable means but which preferably takes the form of a conventional spring retaining ring 12 spring-seated in a groove 13 opening into the bore and which forms an artificial backing shoulder for said part, and a specially constructed retaining ring 14 seated in a groove 15 also opening into the bore, said ring 14 being disposed on the outer or bore-mouth side of said part 11 and serving to secure said part against unintentional or accidental axial separating movement from the bore. Illustratively, the part 11 is provided on its relatively outer radial face with a circular projection 16 having diameter slightly less than that of the normal internal diameter of the retaining ring 14 and which extends into the opening of said ring. Thus the projection 16 serves to center the retaining ring on said part 11 and hence with respect to the bore 10a.

On the understanding that the aforesaid tubular part typifies a housing, a relatively thick-wall cylindrical container or the like, and that the aforesaid part 11 is representative of a machine element of a type which would be mountable in a housing bore or an internally mounted end wall or cover plate of a container, said parts will be hereinafter referred to for convenience as "a container" and "a cover plate," respectively.

As above forecast, the retaining ring 14 which forms an important part of the invention is of the type which is permanently mounted in the bore of the container 10 adjacent its mouth end, whereas the cover plate 11 is removable from said container. Such of course necessitates that the ring 14, despite the fact that it functions as a so-called internal ring, be spreadable by an amount such that its internal diameter corresponds substantially to the diameter of said bore, as permits axial movement of the cover plate into and out of the mouth end of the bore without ring interference. To make this possible, the depth of the groove 15 must also be substantially greater than the depth of the grooves in which conventional internal spring retaining rings are mounted, in the present instance being at least equal to the radial thickness of the ring 14. Thus, when the ring 14 is spread the maximum amount permitted by the depth of its groove 15, it in effect retracts substantially completely within its deep groove, whereupon the cover plate 11 can move freely into and from the bore, as facilitates its assembly and disassembly.

In addition, the aforesaid retaining ring 14 must be of a design and construction enabling it to satisfy even more stringent requirements in use. More particularly, it should be capable of deforming circularly when contracted during the course of its initial assembly in its groove 15. When so assembled and in its unstressed state, its inner and outer edges should be effectively concentric with the circles of the bottom of its groove and of the bore wall, respectively, thereby to center the ring with respect to the bore circle in both its unstressed and stressed (fully spread) condition. Further, the ring should be capable of deforming circularly when spread an amount such that its inner-edge circle corresponds substantially to that of the bore circle, as is necessary to permit axial movement of the cover plate 11 into and out of the bore without ring interference, as aforesaid.

Finally, the retaining ring must also include provision for coupling the spreader element of a cover-plate assembling and disassembling fixture according to the invention thereto, without any intrusion of the fixture into the inner circular space or opening defined by the ring inner edge, through which the cover plate must move.

To function as herein intended, said retaining ring 14 must of necessity be a precision part, and its precision construction will now be described. Referring to FIGS. 2 and 3, such a ring comprises a split or open-ended ring body having an inner, shoulder-defining edge 14a extending along a circle of radius $R_1$ struck from a center $C_1$, an outer edge 14b extending along a circle of radius $R_2$ struck from a center $C_2$ which is eccentric to center $C_1$ in the direction of the middle section of the ring, i.e. the section opposite the gap between the open ends of the ring, by a calculated amount such that the ring body has progressively decreasing section height from said middle section to near its free or open ends as endows it with the property of deforming circularly when spread or contracted within the elastic range, and so-called end lugs 17, 18 of uniform section height whose inner edges are segments of the ring-body inner edge 14a and whose outer edges are formed as arcs of a circle of radius $R_3$ struck from the aforesaid center $C_1$ and which also contains a point on the outer edge of the ring body at its aforesaid middle section. Stated otherwise, the lugs 17, 18 have the same section height as the middle section of the ring body and thus aid in providing the ring with an outer edge of radius $R_3$ which is effectively circular and concentric with its inner or shoulder-forming edge, despite the eccentricity of the major portion of said ring outer edge to said inner edge. Thus, to the extent so far described, the ring 14 has the general form suggested by the Feitl Patent No. 2,491,306, dated December 13, 1941, which with the present application is commonly owned.

However, the retaining ring 14 of the present invention differs from the ring of the Feitl patent in that it is provided on a face thereof with shoulder means of a character enabling coupling thereto of a ring spreader member so constructed as not to intrude into the internal space or opening defined by the ring inner edge 14a, either prior to or after it has been spread, as will be hereinafter described in detail. More particularly, the aforesaid shoulder means preferably comprises a counterbore formed in a face of the ring along its inner edge, such resulting in a thinned inner-edge zone 14c which terminates radially outwardly in a circular edge wall forming a right-angled shoulder 14d (FIG. 3) which is concentric with the inner-edge proper of the ring body. Thus, by assembling the retaining ring 14 in its groove 15 so turned that its aforesaid counterbore faces towards the mouth end of the container bore, the shoulder 14d defined by the edge wall of the counterbore provides a circular abutment shoulder against which a radially-spreadable spreader member inserted into the bore 10 may be engaged for the purpose of spreading said retaining ring. Such assumes that the mouth end of the bore has enlarged diameter as permits insertion and operation of said ring member without taking away space required for movement of cover plate 11 through the bore as aforesaid. For this purpose, the mouth end of the bore has enlarged diameter 10b, in comparison to its main bore portion 10a, by an amount sufficient to enable the spreader member to operate as intended.

Referring now to the fixture according to the invention for use with a retaining-ring application as aforesaid in assembling and disassembling the cover plate 11 relative to the container 10 as needed, such basically comprises the aforementioned spreader member which is hereinafter designated 20, and power-operated means generally designated 30 for actuating (spreading) said element and thereby the retaining ring 14. As best seen in FIGS. 6 and 7, the spreader member 20 comprises a split or open-ended band-form body of spring material having substantial axial dimension and being provided at its free ends and also at its middle portion, i.e. the portion opposite the gap between the open ring ends, with radially outwardly protruding apertured lugs 21, 22 and 23. Like the retaining ring 14 and for the same purpose of insuring circular deformation when spread, the body part of the spreader band 20 is of so-called tapered construction, that is, its outer peripheral surface is eccentric by a calculated amount to its inner-edge surface in the direction of the middle section of the ring whereby it has progressively decreasing section height (radial thickness) from its said middle section to its free ends. According to a further feature of the invention, the working part of the spreader band which is constituted by one end edge portion 26 thereof, although having the same internal diameter as the band body, has reduced uniform radial thickness and thus extends axially therefrom as a cylindrical flange. By design, the internal diameter of the spreader band and its aforesaid working edge or flange 26 in the normal unstressed condition of the former is approximately equal to that of the inner-edge circle of the retaining ring 14 in the unstressed state of the latter, and the outer diameter of said cylindrical flange-like working edge 26 is slightly less than the diameter of the circle of the aforesaid retaining step or shoulder 14d, which diameter relationships are best illustrated in FIG. 9. As also seen in FIG. 9, the axial length of said flange-like working edge 26 of the spreader band is somewhat greater than the axial distance between the radial face 14a of the retaining ring counterbore and the end face of the container 10, thus to insure adequate spreading room for the working edge portion of the band 20 when operatively engaged with the retaining ring 14.

Referring particularly to FIGS. 4, 8 and 10, the spreader-band actuating means 30 illustratively comprises a double-acting power cylinder 31 and its reciprocatory piston 32, which latter is actuable by pressure fluid (air or oil) supplied alternately to opposite ends of the cylinder via inlet and exhaust passages 33, 34 under the control of a four-way valve (not shown). The rod 32a of said piston 32 has sliding bearing in an axially thick extension 35 on the under-face cylinder head, and is rigidly affixed at its outer or free end to a transverse bar-like cross head 36, the non-working end of which mounts a guide rod 37 similarly having sliding bearing in the cylinder-head extension 35. The other or working end of the head member 36 extends generally parallel to a lug 38 formed at the relatively upper or free end of an inclined integral neck on the cylinder-head extension 35, as indicated.

The aforesaid power cylinder 31 is adapted to be coupled to the spreader band 20 by means of pins 40, 41 which are removably inserted in pin apertures 40a, 41a provided in the adjacent ends of said actuating head 36 and companion lug 38 and thence through the apertures of the aforesaid end ears 21, 22 of the spreader band 20. Preferably, in the normal or non-working positions of said spreader band and the power means for actuating the same, the spreader band is unstressed and the piston 32 is in its mid-stroke (neutral) position. Should the spreader band 20 require some contraction as permits its working edge 26 to move freely into the mouth end 10b of the container bore and to be disposed inwardly of the step or shoulder 14d of the retaining ring 14, such contraction takes place with admission of pressure fluid to the under face end of the cylinder 31 via passage 34, as forces piston 32 to the right as in FIG. 8. Then, upon pressure fluid being admitted to the head end of the cylinder 31 via the passage 33, the piston 32 is reciprocated towards the left (FIG. 10), such effecting a spreading of the band 20 and a corresponding spreading of the retaining ring 14, which of course assumes that coupling of the spreading band with said ring has been previously effected as aforesaid. By this arrangement, stress on the spreading band is substantially reduced and the life of the fixture is correspondingly prolonged.

As seen in FIG. 5, the spreader band 20 is preferably supported from the power cylinder 31 by means in addition to the aforesaid pins 40, 41. More particularly, the cylinder head extension 35 mounts an upright plate-like bracket 46 whose upper end extends relatively rearwardly of the lug 23 provided at the middle portion of the spreader band 20, as previously described in connection with FIG. 6. A pin 47, preferably having its forward end 47a ensmalled as shown, is mounted on the upper end of said bracket, in position such that its said reduced forward end extends into the aperture of said lug 23, thus in effect hanging or suspending the band from the upper end of the bracket 46. To provide for such limited lateral movement of the lug 23 which takes place as the band 20 spreads to and from its FIG. 8 position from and to its FIG. 10 position, either the pin 47 has a loose mounting in the bracket 46, or said bracket 46 itself is movably mounted to enable the necessary lateral movement of said pin 47.

While it is believed that the operation of the fixture as described in disassembling and assembling a cover plate 11 with respect to the container 10 will be clear from the above description, such is briefly summarized as follows: Let it be assumed that a cover plate 11 is locked in place in the bore 10a of the container 10 by the retaining ring 14 associated therewith as in FIG. 1, and that it is desired to remove said cover plate from the container. In line with these assumptions, the container 10 and its cover plate 11 are associated with the fixture in such manner that the cylindrical flange-like working edge 26 of the spreader band 20 enters the mouth end 10b of the container bore until it engages against the floor 14a of the retaining ring counterbore, in which position the outer peripheral surface of said working edge is closely adjacent the shoulder or step 14d of the retaining ring provided by its said counterbore. As explained above, such engagement may necessitate limited contraction of the spreader band 20, but this is readily achieved by admission of pressure fluid initially to the under-face end of the power cylinder 31 via passage 34, whereupon the piston is moved from its neutral or mid-position to the right as effects such contraction. Pressure fluid is now admitted to the right end of the power cylinder 31 via passage 33, with the result that the cross-head 36, which is coupled to one end of the spreader band 20, is positively moved laterally away from the lug 38 to which the other end of the spread band is coupled. Such results in spreading of the band against the retaining ring step 14d and a corresponding spreading of said retaining ring in its groove 15 the desired amount such that the inner diameter of said ring now becomes at least as great as that of the container bore 10a, the requisite amount of band spreading being made possible both by the increase in diameter of the bore end 10b and the thinning of the working end 26 of the spreader band. Since now the spreader band defines an opening of diameter which corresponds substantially to the inner diameter of the spread retaining ring 14, which in turn corresponds to the diameter of the bore 10, the closure plate 11 may be withdrawn from the bore of the container through the enlarged openings of both the retaining ring 14 and the spreader band 20. Or, by turning the container and fixture coupled thereto approximately 180°, the now freed closure plate will drop out from said container.

When a new cover plate is to be inserted or the previously removed cover plate re-inserted, the container 10 is placed against the fixture as heretofore and the spreader band 20 and retaining ring 14 is spread as just described. Thereupon, the closure plate is inserted through the correspondingly spread band and retaining ring until it engages against the backing ring 12, whereupon, by reversal of pressure fluid in the cylinder 31, the spreader band and retaining ring 14 each retracts to its unstressed state in which the ring now acts as a locking ring serving to secure the closure plate in place, as in FIG. 1. Since retraction of the spreader band 20 in effect disengages same from the locking ring shoulder 14d, the container may now be separated from the spreader band and fixture as a whole, and put to its intended use.

Without further analysis, it will be appreciated that the retaining ring application, the novel retaining ring for use therein, and the fixture for spreading said retaining ring without bodily removing same from the tubular member of said application, each effectively achieves the objectives therefor as explained in the early part of the present specification. However, it will be understood that many changes could be made in carrying out the above constructions without departing from the scope of the invention, and accordingly it is intended that all matter contained in the above description or shown in the accompanying drawings shall be interpreted as illustrative and not in a limiting sense.

We claim:

1. Means for spreading a split spring retaining ring within a bore groove comprising a generally circular bandform member of spring material and being of split construction whereby it is spreadable and contractible within limits, said member having progressively decreasing radial thickness from its middle section to its free ends whereby it deforms circularly and being provided along one edge with ring engaging means, and power means operatively connected to the free ends of said member for effecting limited contraction of said member as may be necessary to initially engage said ring engaging means with the ring to be spread and thereupon for spreading said member to in turn spread said ring.

2. Means for spreading a split spring retaining ring within a bore groove comprising a generally circular bandform member of spring material and being of split construction whereby it is spreadable within limits and being provided along one edge with ring engaging means, said member having progressively decreasing radial thickness from its middle section to its free ends whereby it deforms circularly when spread, said ring engaging means comprising a split cylindrical flange having uniform radial thickness throughout its arcuate length, and power means operatively connected to the free ends of said member for spreading the latter and thereby the ring engaged by said cylindrical flange.

3. Means for spreading a split spring ring according to claim 1, wherein said power means comprises an air cylinder and a piston reciprocating therein, and wherein said cylinder is operatively coupled to one free end and the piston is operatively coupled to said other free end of said band-form member and said cylinder mounts supporting means for said band-form member to which said member is connected at its middle length portion.

References Cited by the Examiner
UNITED STATES PATENTS

| | | | |
|---|---|---|---|
| 1,379,021 | 5/21 | Johnson | 29—224 |
| 1,447,561 | 3/23 | Martinelli | 29—224 |
| 1,430,702 | 10/22 | Troutman | 29—222 |
| 1,755,044 | 4/30 | Bailey | 29—222 |
| 2,840,892 | 7/58 | Erdmann | 29—229 X |
| 3,104,905 | 9/63 | Erdmann et al. | 292—256.6 |

WILLIAM FELDMAN, *Primary Examiner*.

MILTON S. MEHR, M. HENSON WOOD, Jr.,
*Examiners.*